US010618469B2

(12) United States Patent
Hussler et al.

(10) Patent No.: US 10,618,469 B2
(45) Date of Patent: Apr. 14, 2020

(54) SYSTEMS AND METHODS FOR THE REPRESENTATION OF A REAR OUTER REGION OF A VEHICLE

(71) Applicant: Huf Hülsbeck & Fürst GmbH & Co. KG, Velbert (DE)

(72) Inventors: Berthold Hussler, Ahaus (DE); Marco Rosenbaum, Meerbusch Lank-Latum (DE); Gerd Buschmann, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/067,027

(22) PCT Filed: Nov. 14, 2016

(86) PCT No.: PCT/EP2016/077582
§ 371 (c)(1),
(2) Date: Jun. 28, 2018

(87) PCT Pub. No.: WO2017/114608
PCT Pub. Date: Jul. 6, 2017

(65) Prior Publication Data
US 2018/0370436 A1 Dec. 27, 2018

(30) Foreign Application Priority Data
Dec. 30, 2015 (DE) .................. 10 2015 122 997

(51) Int. Cl.
*B60R 11/04* (2006.01)
*B60R 1/00* (2006.01)
(Continued)

(52) U.S. Cl.
CPC ............... *B60R 1/00* (2013.01); *B60K 35/00* (2013.01); *B60R 11/04* (2013.01);
(Continued)

(58) Field of Classification Search
CPC ............... B60R 1/00; B60R 2011/004; B60R 2300/105; B60R 2300/8046;
(Continued)

(56) References Cited

U.S. PATENT DOCUMENTS

| 9,854,209 B2 * | 12/2017 | Aich .................... H04N 7/181 |
| 2013/0229519 A1 * | 9/2013 | Kavuru .................. B60R 11/04 |
| | | 348/148 |

(Continued)

FOREIGN PATENT DOCUMENTS

| DE | 102011118253 A1 | 5/2013 |
| DE | 102012004640 A1 | 9/2013 |

(Continued)

OTHER PUBLICATIONS

Sohn et al, High definition video based multi channel top view vehicle surrounding monitoring system for mobile navigation devices (Year: 2013).*

(Continued)

*Primary Examiner* — Shan E Elahi
(74) *Attorney, Agent, or Firm* — Honigman LLP; Matthew H. Szalach; Jonathan P. O'Brien

(57) ABSTRACT

A method for displaying a rear outside area of a vehicle, with at least one camera device on the vehicle, includes bringing the camera device into various camera positions and sensing different camera-position-dependent imaging areas of the outside area by the camera device as a function of the particular camera positions. A fixed imaging area of the outside area is sensed by the camera device independently of the camera position in order to display the fixed imaging area for an operator of the vehicle.

23 Claims, 3 Drawing Sheets

Figure 2:
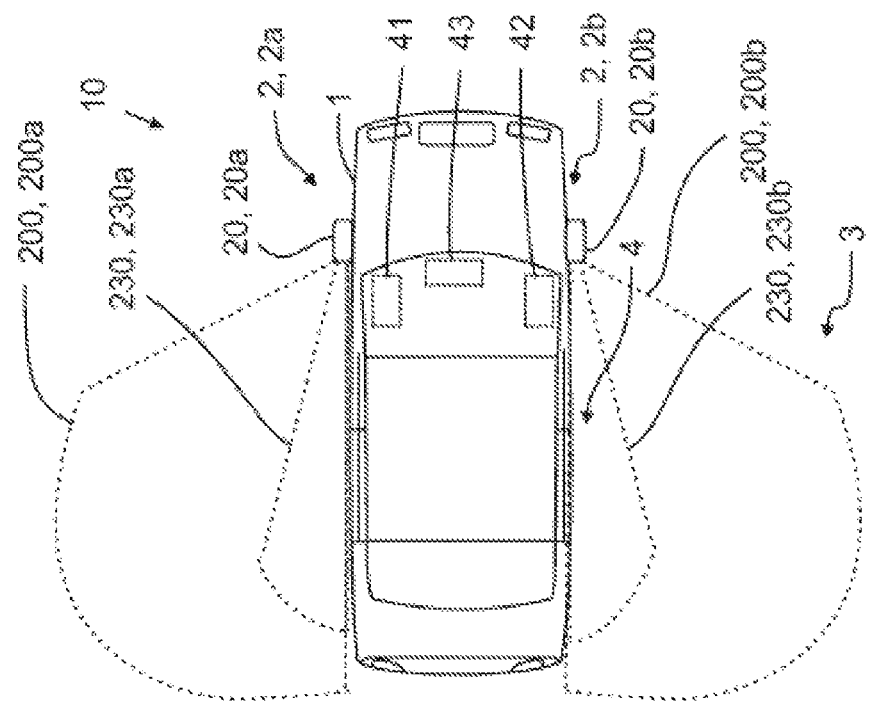

(51) Int. Cl.
*H04N 5/232* (2006.01)
*B60K 35/00* (2006.01)
*G06K 9/00* (2006.01)
*H04N 5/247* (2006.01)
*B60R 11/00* (2006.01)
*G09G 3/3208* (2016.01)

(52) U.S. Cl.
CPC ..... *G06K 9/00791* (2013.01); *H04N 5/23299* (2018.08); *H04N 5/247* (2013.01); *B60K 2370/152* (2019.05); *B60K 2370/21* (2019.05); *B60K 2370/52* (2019.05); *B60R 2011/004* (2013.01); *B60R 2300/101* (2013.01); *B60R 2300/105* (2013.01); *B60R 2300/802* (2013.01); *B60R 2300/8046* (2013.01); *G09G 3/3208* (2013.01)

(58) Field of Classification Search
CPC ............... B60R 2300/101; B60R 11/04; B60R 2300/802; G06K 9/00791; H04N 5/23299; H04N 5/247; B60K 35/00; B60K 2370/152; B60K 2370/21; B60K 2370/52; G09G 3/3208

USPC ........................................................ 348/148
See application file for complete search history.

(56) References Cited

U.S. PATENT DOCUMENTS

2014/0362221 A1* 12/2014 Schofield ........... G06K 9/00818
348/148
2016/0148062 A1* 5/2016 Fursich ................ H04N 13/239
348/36
2016/0198126 A1* 7/2016 Matsumoto ........... H04N 7/181
348/118

FOREIGN PATENT DOCUMENTS

EP 2955065 A1 12/2015
EP 3028898 A1 6/2016

OTHER PUBLICATIONS

European Patent Office, International Search Report and Written Opinion for Application No. PCT/EP2016/077582, dated Feb. 2, 2017.

\* cited by examiner

SYSTEMS AND METHODS FOR THE REPRESENTATION OF A REAR OUTER REGION OF A VEHICLE

CROSS REFERENCE TO RELATED APPLICATIONS

This application is the national phase of International Application No. PCT/EP2016/077582, filed Nov. 14, 2016, which claims priority to European Application No. 10 2015 122 997.8, filed Dec. 30, 2015. The disclosures of these prior applications are considered part of the disclosure of this application and are hereby incorporated by reference in their entireties.

FIELD

The present disclosure relates generally to a method for displaying a rear outside area of a vehicle.

BACKGROUND

This section provides background information related to the present disclosure and is not necessarily prior art.

It is known from the prior art to employ one or more camera devices on a vehicle for sensing an outside area (e.g., a rear outer region) of a vehicle. The camera devices in this case provide image information about the outside area that can serve to improve and/or extend the visibility of a driver of the vehicle. Thus, it is possible, for example, that the image information from a rear camera is displayed on a monitor in the passenger compartment when a reverse gear of the vehicle is engaged for parking.

However, prior art camera devices in vehicles often are of only very limited utility for certain situations, such as parking. Moreover, it has proven to be a disadvantage that the driver can be distracted while driving by the image information about the outside area of the vehicle that is provided. In this regard, it is additionally a problem that the outside area that is displayed frequently is not the safety-relevant area that must be viewed during travel. Thus, depending on the camera position, the provision of image information can also compromise safety during travel.

SUMMARY

This section provides a general summary of the disclosure, and is not a comprehensive disclosure of its full scope or all of its features.

The present invention relates to a method for displaying a rear outside area (e.g., a rear outer region) of a vehicle. In addition, the invention relates (i) to a system for displaying a rear outside area of a vehicle, (ii) to a camera device, and (iii) to a computer program product.

It is therefore an object of the present invention to at least partially remedy the above-described disadvantages. In particular, it is the object of the present invention to ensure safety during travel and preferably to reliably allow visibility of the safety-relevant, rear outside area, in particular in a blind spot of the vehicle.

The above object is attained by a method, a system, a camera device, and/or a computer program product. Additional features and details of the invention are evident from the applicable dependent claims, the description, and the drawings. Features and details described in connection with the method according to the invention also apply, of course, in connection with the system according to the invention, the camera device according to the invention, and the computer program product according to the invention, and vice versa in each case, so that reciprocal reference is always made or can always be made with regard to the disclosure of the individual aspects of the invention.

In particular, the object is attained by a method for displaying a rear outside area of a vehicle, preferably a motor vehicle and/or a passenger vehicle and/or a truck. The vehicle includes at least one camera device, which is and/or can be brought into various camera positions. Provision is made here, in particular, that different camera-position-dependent imaging areas of the outside area of the vehicle can be sensed by the camera device as a function of the particular camera positions. In other words, the change in the camera position changes the imaging area of the outside area that is sensed by the camera device. Preferably, the imaging area is an image of a specific region of the outside area of the vehicle in each case. By preference, the imaging area is an optical image that is created by an optical imaging system of the camera device. Thus, provision can be made, for example, that the camera device has at least one electronic image sensor for digitally recording the image, which image sensor supplies the image information, in particular. According to the invention, provision can be made here that an applicable fixed imaging area of the outside area is sensed by the applicable camera device independently of the camera position of the applicable camera device in order to display the applicable fixed imaging area for an operator, in particular driver, of the vehicle. Thus, it is conceivable that a first camera device senses a first fixed imaging area defined for the first camera device, and a second camera device senses a second fixed imaging area defined for the second camera device. In this case, the first fixed imaging area can differ from the second fixed imaging area, but in particular not for different camera positions of the applicable camera device. Display of the fixed imaging area can take place, e.g., in modified or unmodified form, on a display device in the passenger compartment. To this end, the (image) information sensed by the camera device, in particular, is converted into display information so that the fixed imaging area can be displayed on the basis of the display information. This has the advantage that the fixed imaging area, in particular as the safety-relevant outside area of the vehicle, can always be displayed for the operator of the vehicle in normal operation, and consequently safety during operation of the vehicle is improved. The fixed imaging area, which is, for example, at least partially located in a blind spot of the vehicle, in this case is preferably always sensed during normal operation of the camera device, for example whenever the imaging area (which is to say, in particular, the imaging area that is set on the basis of any camera position in normal operation) is also sensed by the camera device.

It is conceivable that the fixed imaging area is sensed independently of the camera position into which the camera device is brought (in particular in normal operation). The camera positions here correspond, for example, to an incremental or continuous shifting of a camera angle of the camera device, and include, e.g., at most an overall imaging area of the rear outside area of the vehicle. In other words, the overall imaging area includes all imaging areas of the camera device that can be sensed by the camera device in normal operation with all of the camera positions of the camera device. The overall imaging area in this case is preferably limited in such a manner that the fixed imaging area is always sensed by the camera device. This has the advantage that the operator of the vehicle can always see the safety-relevant outside area. This is preferably only ensured during normal operation of the camera device, wherein, in a special operating mode and/or a deactivated state of the camera device, for example, such as when reverse gear is engaged and/or during parking or when the vehicle's engine is switched off, the fixed imaging area does not, of course, always have to be displayed and/or does not have to be sensed by the camera device independently of the camera position. The sensing according to the invention of the camera-position-dependent imaging areas and/or the camera positions preferably relate in this regard solely to the normal operation of the applicable camera device, wherein it is especially preferred that outside of normal operation, in particular in a special operating mode, the applicable camera device senses, for example, special imaging areas of the outside area of the vehicle as a function of at least one or of various special camera position(s) of the camera device. Normal operation is, for example, operation during travel and/or when the "digital outside mirror" function is switched on.

Furthermore, provision can be made within the scope of the invention that at least one of the following steps is provided, wherein, in particular, the steps are carried out in any order or consecutively:

orienting of the camera device on the vehicle, wherein a first imaging area is (can be) sensed (by the camera device) in a first camera position and/or first orientation, and respective additional imaging areas are (can be) sensed in additional camera positions and/or additional orientations, in particular as a function of the orientation and/or camera position, determination by the camera device of at least one item of image information about the first imaging area, determination, from the image information, of at least one item of display information about at least a partial first imaging area, displaying of the display information by at least one display device arranged in the passenger compartment for display of the, or of at least one, fixed imaging area of the outside area and/or for display of the imaging area for the operator of the vehicle, wherein the fixed imaging area is displayed (represented) independently of the camera position, in particular as a digital outside mirror to achieve the "digital outside mirror" functionality. This has the advantage that safety during travel can be increased significantly. Furthermore, using the display of the fixed imaging area as an alternative to the outside mirror makes it possible to dispense with an outside mirror on the vehicle, and consequently to improve pedestrian safety, for example. In particular, it is possible to use the display of the fixed imaging area as a digital outside mirror when the fixed imaging area includes an area of the vehicle's outside area that normally is visible to the operator by means of the outside mirror of the vehicle.

The vehicle is optionally designed to be free of side view mirrors and/or outside mirrors, which is to say, in particular, without the usual side view mirrors and/or outside mirrors on the right and/or left sides of the vehicle. Alternatively or in addition, a "digital outside mirror" functionality is provided, for example, that is realized through the display (representation) of the fixed imaging area. In consequence, safety during travel can be ensured and improved.

Preferably, the fixed imaging area is a sub-area of the sensed imaging area, with the fixed imaging area being displayed with the other parts of the imaging area on the display device, for example. The orienting of the camera device on the vehicle is accomplished in that, for example, the camera device is movably attached to the vehicle and/or is extended into a predefined position for normal operation. Provision can subsequently be made, for example, that the camera device is moved as a function of the camera position and/or can assume different camera angles. The camera device can determine the image information, preferably as digital information, in particular by the means that at least one image sensor of the camera device is analyzed digitally and/or electronically. The display information is determined, for example, by the means that the image information is in modified or unmodified form, and/or is transmitted to the display device. Furthermore, the determination of the display information preferably can include still more processing steps, for example an extraction of the fixed imaging area by image processing on the basis of the image information. In consequence, the fixed imaging area can be displayed in a simple manner through digital processing of the image information.

Provision can be made to additional advantage that the camera device is moved, in particular pivoted, for orienting it relative to the vehicle in order to change the imaging area (as a function of the camera position), wherein the fixed imaging area is sensed and/or displayed independently of the motion of the camera device and preferably the display of the fixed imaging area is motion-compensated for this purpose. The motion compensation is carried out through digital image processing on the basis of the image information, for example. The camera device can be moved, in particular, in the horizontal and/or in the vertical direction in order to sense different imaging areas. In order to permit, e.g., the display of the fixed imaging area as a digital outside mirror in spite of these different imaging areas, it is ensured, in particular by image processing and/or by motion compensation, that the fixed imaging area is always displayed essentially consistently and/or with a fixed perspective for the operator by the display device in normal operation.

It is advantageous, in addition, when the camera device is oriented on the vehicle as a function of the camera positions for sensing the applicable camera-position-dependent imaging areas, wherein the orientation, for example with respect to the maximum degree of deflection of the camera device, is limited such that the fixed imaging area (in normal operation) is always included in the applicable camera-position-dependent imaging area. The maximum degree of deflection is predetermined in this case by, e.g., the overall imaging area. Orientation on the vehicle is accomplished, for example, by pivoting and/or by moving and/or by rotating and/or by extending the camera device, wherein, for example, a drive is provided on the vehicle and connected to the camera device for this purpose. The drive here is controlled by, e.g., a control device such that the fixed imaging area is always sensed by the camera device in normal operation. Consequently, it is possible to ensure that the fixed imaging area is sensed and displayed.

In another option, provision can be made that at least one of the following steps is provided, wherein, in particular, the steps are carried out consecutively or in any order:

sensing of a first imaging area by the camera device in a first camera position, determination of a first item of image information about the first imaging area, determination of a first item of display information about at least a partial first imaging area and the fixed imaging area from the first item of image information, displaying of the first item of display information by the display device, wherein the first imaging area is displayed with the fixed imaging area, sensing of a second imaging area by the camera device in a second camera position, wherein preferably a moving of the camera device is carried out to change from the first camera position to the second, determination of a second item of image information about the second imaging area, determination of a second item of display information about at least a partial second imaging area and the fixed imaging area from the second item of image information, displaying of the second item of display information by the display device, wherein the second imaging area is displayed (jointly and/or simultaneously) with the fixed imaging area.

Thus, the fixed imaging area is, in particular, always a fixed area of the outside area that is obtained from the image information (e.g., first and/or second and/or additional image information) currently determined by the camera device. This makes it possible to always extract and display a fixed area of the outside area through a rapid and simple analysis of the image information.

In another option, provision can be made that the imaging areas are each sub-areas of an overall imaging area of the outside area, wherein the camera device in the various camera positions can sense, at a maximum, the overall imaging area. In this case, the overall imaging area is preferably limited such that the fixed imaging area and/or a maximum fixed imaging area can always be sensed by the camera device in normal operation in every camera position. In consequence, safety during travel can be increased.

It is additionally conceivable that the fixed imaging area is displayed from a side-mirror perspective for the operator. Since a fixed area of the, in particular, rear outside area of the vehicle in normal operation is thus always displayed from the same perspective, which is to say the side-mirror perspective, the displayed fixed imaging area, in particular, can be used as a digital outside mirror. It is preferably possible in this case that a first fixed imaging area from a left-hand side-mirror perspective and a second fixed imaging area from a right-hand side-mirror perspective are displayed in the passenger compartment of the vehicle on a common display device or each on different display devices or display means.

Provision can be made, in particular, that the fixed imaging area and/or the camera position can, in particular, be set or adjusted independently of one another by the operator of the vehicle, wherein the fixed imaging area can only be set within a maximum fixed imaging area of an overall imaging area. The adjustability here relates, in particular, to a change of the imaging area, for example in the vertical and/or horizontal direction. The camera position in this case is adjusted, for example, by a control of the motion of the camera device and/or by a defining of the position of the camera device. In this context, the fixed imaging area and/or the maximum fixed imaging area can be adjusted, preferably by the operator of the vehicle, through, e.g., a parameterization of the image processing and/or of a control device for camera positioning.

In particular, the adjustment of the fixed imaging area in, at most, the area of the maximum fixed imaging area is comparable, in principle, to the adjustment of an outside mirror by the operator. Consequently, the fixed imaging area can, in particular, be shifted by means of the adjustment, wherein the limits of the maximum fixed imaging area cannot be exceeded by the shifting.

In addition, provision can be made that, in addition to the shifting, an expansion of the fixed imaging area within the maximum fixed imaging area is possible through the adjustment. The overall imaging area in this case includes the maximum fixed imaging area, and the maximum fixed imaging area includes the fixed imaging area, so the maximum fixed imaging area cannot become larger than the overall imaging area, and the fixed imaging area cannot become larger than the maximum fixed imaging area. In consequence, a versatile adjustability of, in particular, the digital outside mirror functionality is ensured.

In addition, it is conceivable that an analysis is carried out of at least one item of image information of the camera device, wherein a perspective modification of the image information takes place through the analysis such that a partial or complete (artificial) side view and/or a top view (for example of the vehicle and/or the outside area) is generated. The analysis here can include the image processing, for example. In consequence, the analysis preferably can also include the generation and/or extraction of the fixed imaging area from the image information.

It is conceivable here that the fixed imaging area is displayed on a first display means of the display device, and the side and/or top view is displayed on a second and/or third display means of the display device. The display device and/or the display means are, e.g., separate monitors or screens in this case. It is conceivable here that the display means are each independent screens or, alternatively, are only certain regions of a single display device. The display device and/or the display means in this context can be arranged in the front region of the vehicle for the operator of the vehicle, for example in the region of an instrument panel and/or of a dashboard of the vehicle. The first display means in this case is arranged, e.g., to the left side of the operator or on the left side in the vehicle, the second display means to the right side of the operator or on the right side in the vehicle, and the third display means in the center in the vehicle, in particular in the region of a center console of the vehicle. This has the advantage that safety and convenience during operation of the vehicle can be increased, in particular through a display of the outside area from different perspectives.

In addition, it is conceivable within the scope of the invention that critical objects in the region of the vehicle are detected by an analysis of the image information of the camera device, for example because they are located directly next to the vehicle or are located behind and to the side of the vehicle, so that these critical objects can be indicated by a warning. This warning may be, on the one hand, a warning sound, or an illuminated signal, or another indicator, such as, e.g., vibration of the steering wheel. If a visual warning function is chosen, it can be clearly displayed on the display device, for example as a warning triangle or a red dot or the like.

It is additionally conceivable that an item of display information is determined that includes information about a fixed imaging area and/or an imaging area defined by the camera position. Provision is made here, in particular, that an algorithm and/or image processing is carried out by an analysis device for analysis of the image information in order to generate the information from the image information from a camera device, in particular an individual camera device.

To this end, the analysis device includes at least one electronic component, as for example a microprocessor and/or a digital signal processor and/or a nonvolatile data storage unit and/or an integrated circuit. In consequence, the fixed imaging area can be extracted reliably.

Optionally, it is conceivable that the fixed imaging area is an outside mirror area of the vehicle that is relevant to traffic safety, wherein the operator can change the area of the imaging area outside of the fixed imaging area as desired within the overall imaging area and, in particular, can only change the fixed imaging area to a limited extent within the maximum fixed imaging area, wherein preferably the fixed imaging area has at least 20% or at least 40% or at least 60% of the extent of the imaging area and/or of the overall imaging area. Safety during travel is further optimized by this means.

Preferably, provision can be made that the camera position and/or the fixed imaging area, preferably an extent and/or position (of the imaging area) of the camera position and/or of the fixed imaging area, is adjusted through a control device, wherein, in particular, the control device is designed for operation by the operator, wherein preferably the camera position and/or a maximum orientation of the camera device is limited by the adjustment of the fixed imaging area. Moreover, it is conceivable that the camera position and/or the maximum orientation is/are limited by the maximum fixed imaging area and/or overall imaging area. The control device is preferably connected electrically to a drive for orienting and/or moving the camera device. This makes it possible for the imaging area and the fixed imaging area to be changed reliably.

A system for displaying a rear outside area of a vehicle, with at least one camera device on the vehicle, is also the subject matter of the invention. In this regard, provision is made that the camera device can be brought into various camera positions, and different camera-position-dependent imaging areas of the outside area can be sensed by the camera device as a function of the particular camera positions. Provision is made, in particular, that a fixed imaging area of the outside area can always be sensed by the camera device independently of the camera position. In consequence, a fixed imaging area is preferably displayed for an operator of the vehicle, in particular by a display device and/or a display means in the passenger compartment of the vehicle. In consequence, the system according to the invention yields the same advantages as have been described in detail with regard to a method according to the invention. Moreover, the system according to the invention can be capable of being operated in accordance with a method according to the invention.

It can additionally be possible that the camera device is arranged in the front area of the vehicle such that a blind spot can be sensed on the vehicle, preferably completely or to a large extent. In this context, the blind spot is, in particular, the rear field of vision of the vehicle that is not visible in the correctly adjusted outside mirror to the operator of the vehicle despite the outside mirror. In this case, a first camera device can be arranged on the vehicle on the left side, for example, and a second camera device can be arranged on the vehicle on the right side. Safety during travel is further improved by this means.

It is additionally conceivable that the camera device is arranged on a fender of the vehicle in the front area of the vehicle, wherein preferably a first camera device is arranged on a front, left-hand fender in the vehicle direction, and a second camera device is arranged on a front, right-hand fender in the vehicle direction. Alternatively or in addition, it is conceivable that the camera device, in particular the first and/or second camera device, is/are arranged further forward on the vehicle than an outside mirror of the vehicle is customarily located. In consequence, the advantage can be achieved that a broader rear area on the vehicle is sensed than is possible through conventional outside mirrors.

Provision can furthermore be made that a first camera device is arranged on the left-hand side and a second camera device on the right-hand side of the vehicle, and in particular is oriented such that every imaging area of the first camera device that can be set (through the camera position) lies within a first overall imaging area of the outside area, and every imaging area of the second camera device that can be set (through the camera position) lies within a second overall imaging area of the outside area. In particular, different camera devices, preferably at least two and/or at least three and/or at least four and/or at least five camera devices, can be provided on a vehicle, wherein the method according to the invention can preferably be carried out on each camera device. This has the advantage that the driver obtains a comprehensive overview of the outside area of the vehicle.

Optionally, provision can be made that the camera device is designed to be vertically and/or horizontally pivotable by at least one drive, by which means the camera position can be adjusted. Alternatively or in addition, it is conceivable that the camera device can be brought into a retracted and an extended state by at least one drive, wherein the camera device in the retracted state is retracted completely into the vehicle, in particular into a receptacle of the vehicle. In consequence, a comprehensive orientation of the camera device on the vehicle is possible.

Furthermore, it is conceivable that the display device and/or at least one display means of the display device, in particular as a monitor, is arranged to the side in the vehicle passenger compartment, wherein the display device and/or at least one display means of the display device preferably is implemented as an OLED display. The display device and/or the display means in this case includes, e.g., multiple organic light-emitting diodes (OLED) in order to further improve safety through a high-contrast display.

Provision can additionally be made within the scope of the invention that the camera device is implemented as an external camera of the vehicle, preferably with an image sensor, in particular only a single image sensor, preferably a CMOS (complementary metal-oxide-semiconductor) or CCD (charge-coupled device) sensor. The image sensor in this design can have, e.g., a resolution and/or pixel count of at least 1 megapixel and/or at least 2 megapixels and/or at least 3 megapixels and/or at least 4 megapixels and/or at least 8 megapixels and/or at least 16 megapixels. Moreover, it is conceivable that the camera device is matched to the display device, or vice versa, with respect to the pixel count. In this way, a reliable display of the outside area is ensured.

In addition, provision can be made that the display device includes at least one display means, preferably a monitor or display unit, in the passenger compartment of the vehicle, wherein a first display means displays a first fixed imaging area of a first camera device on the left side in the vehicle passenger compartment and/or a second display means displays a second fixed imaging area of a second camera device on the right side in the vehicle passenger compartment and/or a third display means displays a perspective modification of image information, preferably in the region of a center console of the vehicle. It is conceivable in this regard that the first display means and/or the second display means displays solely the (first and/or second) fixed imaging area or, alternatively, additionally displays still more areas of the outside area beyond the fixed imaging area along with the display of the fixed imaging area. In this way, it is possible to ensure that the operator of the vehicle can also see areas of the rear outside area that are difficult to see. The fixed imaging area is thus, in particular, solely a rear outside area of the vehicle from the perspective of the vehicle driver.

Protection is likewise claimed for a camera device for sensing and/or displaying a rear outside area of a vehicle, which in particular is capable of being operated in accordance with a method according to the invention. As a result, the camera device according to the invention yields the same advantages as have been described in detail with regard to a method according to the invention and/or a system according to the invention.

The subject matter of the invention is likewise a computer program product, in particular for operating a system according to the invention that is designed to carry out a method according to the invention. The computer program product in this case is implemented, e.g., as a computer program and/or as data memory with a computer program and/or as firmware for an analysis device. As a result, the computer program product according to the invention yields the same advantages as have been described with regard to a method according to the invention and/or a system according to the invention and/or a camera device according to the invention.

Additional advantages, features, and details of the invention are evident from the description below, in which exemplary embodiments of the invention are described in detail with reference to the drawings. The features mentioned in the claims and in the description can be essential to the invention individually in themselves, or in any desired combination.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Figure 1:
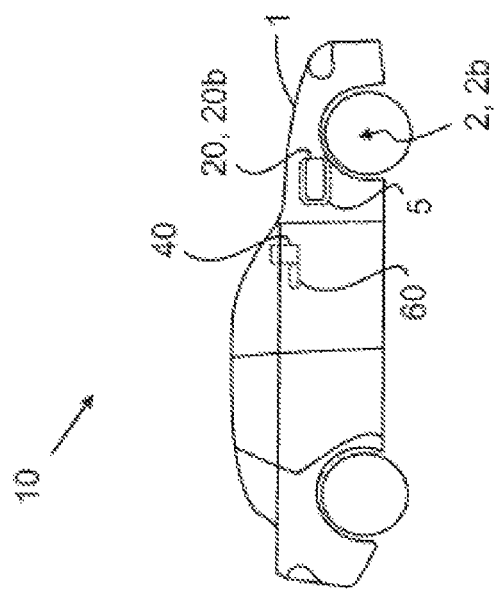
Figure 4:
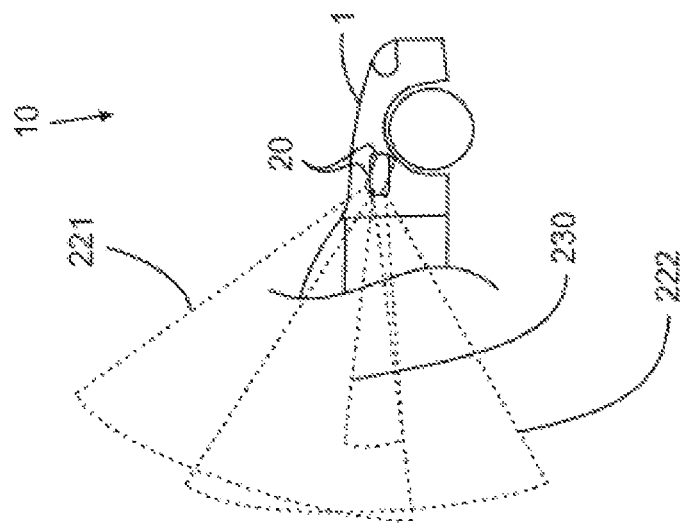
Figure 3:
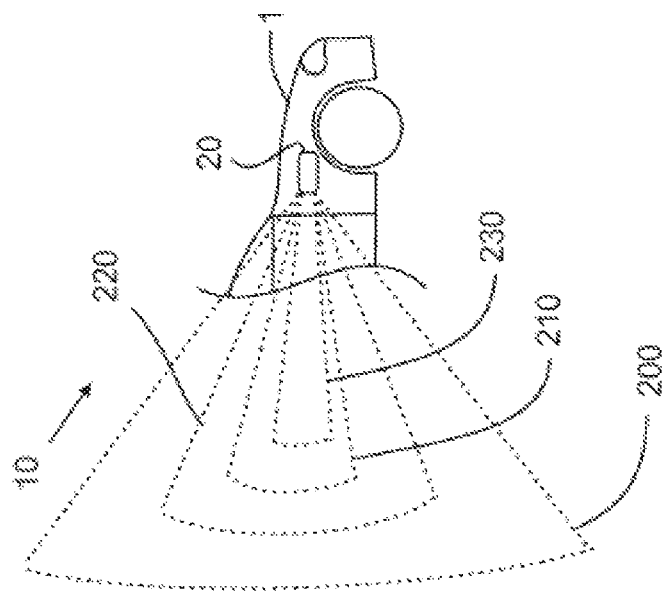
Figure 5:
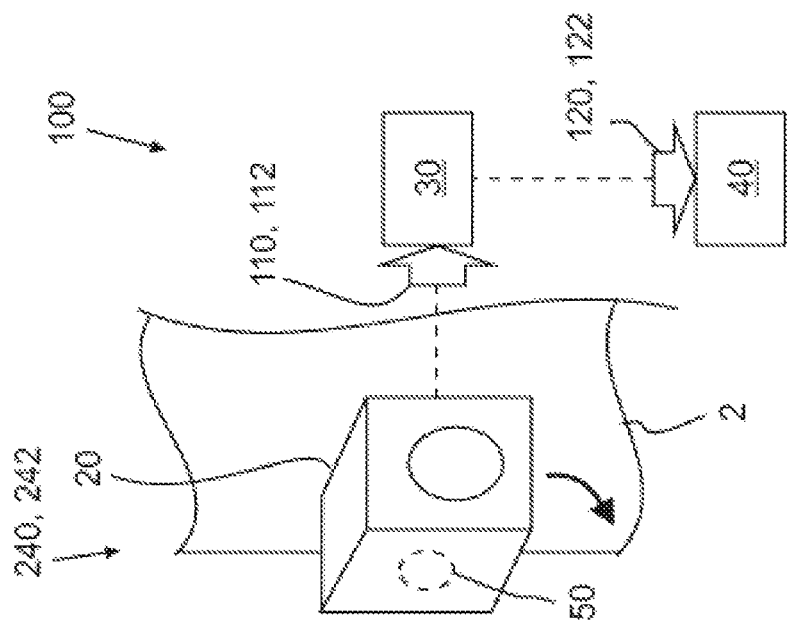
Figure 6:
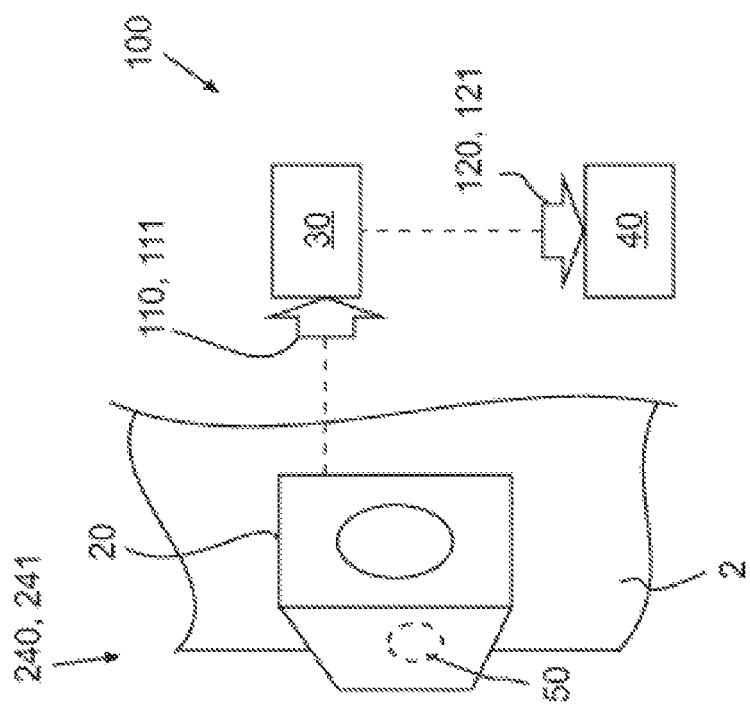

FIG. 1 is a schematic side view of a vehicle with a system according to the invention, FIG. 2 is a schematic top view of a vehicle with a system according to the invention, FIG. 3 is a schematic side view of a vehicle with a system according to the invention, FIG. 4 is another schematic side view of a vehicle with a system according to the invention, FIG. 5 is a schematic representation of parts of a system according to the invention for visualization of a method according to the invention, and FIG. 6 is a schematic representation of parts of a system according to the invention for visualization of a method according to the invention.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Shown schematically in FIG. 1 is a system 10 according to the invention that is arranged on a vehicle 1. The system 10 according to the invention in this case includes at least one camera device 20. A first camera device 20a, shown in FIG. 2, can also be arranged on the vehicle 1 on the left-hand side, in addition to a second camera device 20b shown in FIG. 1, which is arranged on the right-hand side of vehicle 1. Preferably, a first camera device 20a is arranged on a left-hand fender 2a and a second camera device 20b is arranged on a right-hand fender 2b in this case. Of course, an arrangement of the camera device 20 on other areas in the front region of the vehicle 1 is also possible in addition to the arrangement of the camera device 20 on the fender 2. For the purpose of arrangement, the vehicle 1 has, in particular, a receptacle 5. Provided in the passenger compartment of the vehicle 1 is, in particular, a display device 40. In addition, the vehicle 1 includes a control device 60, which is likewise arranged in the passenger compartment, in particular completely or partially therein. Thus, the control device 60 can include control elements for an operator of the vehicle 1 in order to orient the camera device 20 by means of a drive 50 shown schematically in FIGS. 5 and 6.

The orientation of the camera device 20 is accomplished, in particular, such that an imaging area 220 can be sensed by the camera device 20. Different imaging areas 220 can be sensed by the camera device 20 as a function of the camera position 240 in this context, wherein all the possible imaging areas 220 must be located within an overall imaging area 200. The overall imaging area 200 is consequently the area that can be sensed at a maximum in the different camera positions 240 by the camera device 20, as is shown in detail in FIG. 2. Thus, a first overall imaging area 200*a* is provided for a first camera device 20*a*, and a second overall imaging area 200*b* is provided for a second camera device 20*b*. The first overall imaging area 200*a* here includes, for example, a left-hand, rear outside area 3, in particular a left-hand blind spot 4, of the vehicle 1. The second overall imaging area 200*b* here includes, for example, a right-hand, rear outside area 3, in particular a right-hand blind spot 4, of the vehicle 1. The fixed imaging area 230 is located further inside the overall imaging area 200, wherein a first camera device 20*a* senses a first fixed imaging area 230*a*, and a second camera device 20*b* senses a second fixed imaging area 230*b*. For the purpose of displaying the first fixed imaging area 230*a*, a first display means 41 of the display device 40, for example, can be arranged on the left side in the passenger compartment of the vehicle 1. For the purpose of displaying the second fixed imaging area 230*b*, a second display means 42 of the display device 40, for example, can be arranged on the right side in the passenger compartment of the vehicle 1. An additional displaying of the outside area 3 can be performed, for example by an additional, third display means 43, for example in the region of a center console in the passenger compartment of the vehicle 1. The fixed imaging area 230 in this case is a sub-area of a maximum fixed imaging area 210, and the maximum fixed imaging area 210 is a sub-area of a sensed imaging area 220, and the imaging area 220 in this case is a sub-area of an overall imaging area 200. This is shown schematically in FIG. 3, wherein the maximum fixed imaging area 210 here is always a sub-area of all imaging areas 220 for different camera positions 240. Alternatively, however, provision can also be made that the maximum fixed imaging area 210 causes no limitation of the imaging areas 220, wherein the overall imaging area 200 is then varied as a function of the fixed imaging area 230 that is set.

The sensed imaging area 220 can be changed as a function of the camera positions 240. Thus, it is shown in FIGS. 4 to 6 that a first imaging area 221 is sensed in a first camera position 241, and a second imaging area 222 is sensed in a second camera position 242. The fixed imaging area 230 is always a sub-area of the imaging area 220, independently of the camera position 240, as can be seen clearly in FIG. 4.

Additionally, a method 100 according to the invention is visualized schematically in FIGS. 5 and 6. Here, the camera device 20 senses and/or determines an item of image information 110 in every camera position 240 in normal operation. In particular, a first item of image information 111 is sensed and/or determined in a first camera position 241 and a second item of image information 112 is sensed and/or determined in a second camera position 242. The image information 110 is subsequently analyzed by an analysis device 30, e.g., through image processing, wherein subsequently an item of display information 120, in particular a first item of display information 121 for a first camera position 241 and a second item of display information 122 for a second camera position 242, is transmitted to the display device 40.

LIST OF REFERENCE SYMBOLS

1 vehicle
2 fender
2*a* left fender
2*b* right fender
3 outside area
4 blind spot
5 receptacle
10 system
20 camera device
20*a* first camera device
20*b* second camera device
30 analysis device
40 display device
41 first display means
42 second display means
43 third display means
50 drive
60 control device
100 method
110 image information
111 first item of image information
112 second item of image information
120 display information
121 first item of display information
122 second item of display information
200 overall imaging area
200*a* first overall imaging area
200*b* second overall imaging area
210 maximum fixed imaging area
220 imaging area
221 first imaging area
222 second imaging area
230 fixed imaging area
230*a* first fixed imaging area
230*b* second fixed imaging area
240 camera position
241 first camera position
242 second camera position The above explanation of the embodiment describes the present invention solely within the framework of examples. It is a matter of course that individual features of the embodiments may be freely combined with one another, if it is technically useful to do so, without departing from the scope of the invention. Such variations are not to be regarded as a departure from the disclosure, and all such modifications are intended to be included within the scope of the disclosure.

What is claimed is:

1. A method for displaying a rear outside area of a vehicle, with at least one camera device on the vehicle, the method comprising:
   bringing the camera device into various camera positions; and
   sensing different camera-position-dependent imaging areas of the outside area by the camera device as a function of the various camera positions, wherein a fixed imaging area of the outside area is sensed by the camera device independently of the camera position in order to display the fixed imaging area for an operator of the vehicle, wherein the camera device is moved, in particular pivoted, for orienting the camera device relative to the vehicle in order to change the imaging area, wherein the fixed imaging area is sensed and/or displayed independently of the movement of the camera device, and preferably the display of the fixed imaging area is motion-compensated.

2. The method according to claim 1, further comprising:
orienting of the camera device on the vehicle, wherein a first imaging area can be sensed by the camera device in a first camera position, and respective additional imaging areas can be sensed in additional camera positions,
determining, by the camera device, at least one item of image information about the first imaging area,
determining, from the image information, at least one item of display information about at least a partial first imaging area,
displaying of the display information by at least one display device arranged in a passenger compartment for display of at least one fixed imaging area of the outside area and/or for display of the imaging area for the operator of the vehicle,
wherein the fixed imaging area is displayed independently of the camera position, in particular as a digital outside mirror.

3. The method according to claim 1, wherein the camera device is oriented on the vehicle as a function of the camera positions for sensing applicable camera-position-dependent imaging areas, wherein an orientation of the camera device is limited such that the fixed imaging area is included in an applicable camera-position-dependent imaging area.

4. The method according to claim 1, further comprising:
sensing of a first imaging area by the camera device in a first camera position,
determining a first item of image information about the first imaging area,
determining a first item of display information about at least a partial first imaging area and the fixed imaging area from the first item of image information,
displaying of the first item of display information by a display device, wherein the first imaging area is displayed with the fixed imaging area,
sensing of a second imaging area by the camera device in a second camera position, wherein preferably a moving of the camera device is carried out to change from the first camera position to the second camera position,
determining a second item of image information about the second imaging area,
determining a second item of display information about at least a partial second imaging area and the fixed imaging area from the second item of image information,
displaying of the second item of display information by the display device, wherein the second imaging area is displayed with the fixed imaging area.

5. The method according to claim 1, wherein the imaging areas are each sub-areas of an overall imaging area of the outside area, wherein the camera device in the various camera positions can sense, at a maximum, the overall imaging area.

6. The method according to claim 1, wherein the fixed imaging area is displayed from a side-mirror perspective for the operator.

7. The method according to claim 1, wherein the fixed imaging area and/or the camera position can, in particular, be set or adjusted independently of one another by the operator of the vehicle, wherein the fixed imaging area can only be set within a maximum fixed imaging area of an overall imaging area.

8. The method according to claim 1, wherein an analysis is carried out of at least one item of image information of the camera device, wherein a perspective modification of the image information takes place through the analysis such that a partial or complete side view and/or top view is generated.

9. The method according to claim 1, wherein an item of display information is determined, the item of display information including information about a fixed imaging area and an imaging area defined by the camera position, wherein preferably an algorithm is carried out by an analysis device for analysis of an item of image information of the camera device, in particular of an individual camera device, in order to generate the information from the image information.

10. The method according to claim 1, wherein the fixed imaging area at least partially includes an outside mirror area of the vehicle, wherein the outside mirror area is relevant to traffic safety, and wherein, in particular, the operator can change the area of the imaging area outside of the fixed imaging area as desired within an overall imaging area and, in particular, can only change the fixed imaging area to a limited extent within a maximum fixed imaging area, wherein preferably the fixed imaging area has at least 20% or at least 40% or at least 60% of the extent of the imaging area and/or of the overall imaging area, wherein the vehicle preferably is designed to be free of outside mirrors.

11. The method according to claim 1, wherein the camera position and/or the fixed imaging area, preferably an extent and/or position of the imaging area of the camera position and/or of the fixed imaging area, is adjusted through a control device, wherein the control device is designed for operation by the operator, wherein preferably the camera position and/or a maximum orientation of the camera device is limited by the adjustment of the fixed imaging area.

12. A system for displaying a rear outside area of a vehicle, the system comprising at least one camera device on the vehicle, wherein the camera device can be brought into various camera positions, and different camera-position-dependent imaging areas of the outside area can be sensed by the camera device as a function of the various camera positions,
wherein a fixed imaging area of the outside area can be sensed by the camera device independently of the camera position in order to display the fixed imaging area for an operator of the vehicle,
wherein the camera device is arranged in a front area of the vehicle such that a blind spot can be sensed on the vehicle, preferably completely or to a large extent.

13. The system of claim 12, wherein the camera device is arranged on a fender of the vehicle in the front area of the vehicle, wherein preferably a first camera device is arranged on a front, left-hand fender in a vehicle direction, and a second camera device is arranged on a front, right-hand fender in the vehicle direction.

14. The system of claim 12, wherein a first camera device on a left-hand side and a second camera device on a right-hand side are arranged on the vehicle, and in particular are oriented such that every imaging area of the first camera device that can be set lies within a first overall imaging area of the outside area, and every imaging area of the second camera device that can be set lies within a second overall imaging area of the outside area.

15. The system of claim 12, wherein the camera device is designed to be vertically and/or horizontally pivotable by at least one drive, by which means the camera position can be adjusted.

16. The system of claim 12, wherein the camera device can be brought into a retracted and an extended state by at least one drive, wherein the camera device in the retracted state is retracted completely into the vehicle, in particular into a receptacle of the vehicle.

17. The system of claim 12, wherein a display device is arranged in a vehicle passenger compartment as a monitor to a side, wherein the display device preferably is implemented as an OLED display.

18. The system of claim 12, wherein the camera device is implemented as an external camera of the vehicle, preferably with an image sensor, in particular only a single image sensor, preferably a CMOS or CCD sensor.

19. The system of claim 12, wherein a display device includes at least one display means, in particular a monitor, in a passenger compartment of the vehicle, wherein a first display means displays a first fixed imaging area of a first camera device on a left side in the passenger compartment and/or a second display means displays a second fixed imaging area of a second camera device on a right side in the passenger compartment and/or a third display means displays a perspective modification of an item of image information, preferably in a region of a center console of the vehicle.

20. The system of claim 12, wherein the system is configured to bring the camera device into various camera positions, and the camera device is configured to sense different camera-position-dependent imaging areas of the outside area as a function of the various camera positions, and wherein a fixed imaging area of the outside area is sensed by the camera device independently of the camera position in order to display the fixed imaging area for an operator of the vehicle.

21. A method for displaying a rear outside area of a vehicle, with at least one camera device on the vehicle, the method comprising:
bringing the camera device into various camera positions; and
sensing different camera-position-dependent imaging areas of the outside area by the camera device as a function of the various camera positions, wherein a fixed imaging area of the outside area is sensed by the camera device independently of the camera position in order to display the fixed imaging area for an operator of the vehicle,
wherein the fixed imaging area is displayed from a side-mirror perspective for the operator.

22. A method for displaying a rear outside area of a vehicle, with at least one camera device on the vehicle, the method comprising:
bringing the camera device into various camera positions; and
sensing different camera-position-dependent imaging areas of the outside area by the camera device as a function of the various camera positions, wherein a fixed imaging area of the outside area is sensed by the camera device independently of the camera position in order to display the fixed imaging area for an operator of the vehicle,
wherein the fixed imaging area and/or the camera position can, in particular, be set or adjusted independently of one another by the operator of the vehicle, wherein the fixed imaging area can only be set within a maximum fixed imaging area of an overall imaging area.

23. A system for displaying a rear outside area of a vehicle, the system comprising at least one camera device on the vehicle, wherein the camera device can be brought into various camera positions, and different camera-position-dependent imaging areas of the outside area can be sensed by the camera device as a function of the various camera positions,
wherein a fixed imaging area of the outside area can be sensed by the camera device independently of the camera position in order to display the fixed imaging area for an operator of the vehicle, and
wherein the system is configured to bring the camera device into various camera positions, and the camera device is configured to sense different camera-position-dependent imaging areas of the outside area as a function of the various camera positions, and wherein a fixed imaging area of the outside area is sensed by the camera device independently of the camera position in order to display the fixed imaging area for an operator of the vehicle.

* * * * *